US008616071B1

(12) United States Patent
Kudo

(10) Patent No.: US 8,616,071 B1
(45) **Date of Patent: *Dec. 31, 2013**

(54) SYSTEMS OF TESTING FIRE FIGHTING VEHICLE FOAM DELIVERY SYSTEMS USING ENVIRONMENTALLY BENIGN SURRROGATE FLUID

(75) Inventor: Rance Tetsuo Kudo, Newbury Park, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/230,597

(22) Filed: Sep. 12, 2011

Related U.S. Application Data

(62) Division of application No. 13/229,960, filed on Sep. 12, 2011.

(51) Int. Cl.
*G01F 1/00* (2006.01)
*G01F 1/05* (2006.01)

(52) U.S. Cl.
USPC .......................................... 73/861; 73/861.79

(58) Field of Classification Search
None
See application file for complete search history.

(56) References Cited

U.S. PATENT DOCUMENTS

| | | | |
|---|---|---|---|
| 4,037,664 | A | 7/1977 | Gibson |
| 6,588,286 | B1 | 7/2003 | Kudo et al. |
| 6,615,675 | B1 | 9/2003 | Kudo et al. |
| 6,715,373 | B2 | 4/2004 | Kudo et al. |
| 6,739,174 | B2 | 5/2004 | Kudo et al. |
| 7,290,457 | B2 | 11/2007 | Kudo et al. |
| 7,293,478 | B2 | 11/2007 | Kudo et al. |

*Primary Examiner* — Harshad R Patel
(74) *Attorney, Agent, or Firm* — Christopher L. Blackburn

(57) ABSTRACT

Systems of/for testing fire fighting vehicle arm delivery systems using an environmentally benign fluid. Systems test the foam delivery systems' piping, values, pump, proportioner, educator, and nozzles while minimizing the release of Aqueous Film Forming Foam to the environment. The testing system complies with the National Fire Protection Association.

18 Claims, 6 Drawing Sheets

SYSTEMS OF TESTING FIRE FIGHTING VEHICLE FOAM DELIVERY SYSTEMS USING ENVIRONMENTALLY BENIGN SURRROGATE FLUID

CROSS-REFERENCE TO RELATED APPLICATIONS

This is a divisional application, claiming the benefit of parent application Ser. No. 13/229,960 filed on Sep. 12, 2011, whereby the entire disclosures of which are incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to systems and methods of testing foam delivery systems on fire fighting vehicles.

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION

Embodiments of the invention generally relate to a testing system for an Automotive Fire Apparatus Vehicle (AFAV). An AFAV is a vehicle to be used under emergency conditions to transport personnel and equipment and to support the suppression of fires and mitigation of other hazardous situations. A purpose vehicle carrying professionals and equipment for a wide range of firefighting and rescue tasks. Typical automotive fire apparatus vehicles carry equipment such as ladders, pike poles, axes and cutting equipment, halligan bars, fire extinguishers, ventilation equipment, floodlights, hose ramps, self-contained breathing apparatus (SCBA), and general tools.

Figure 1:
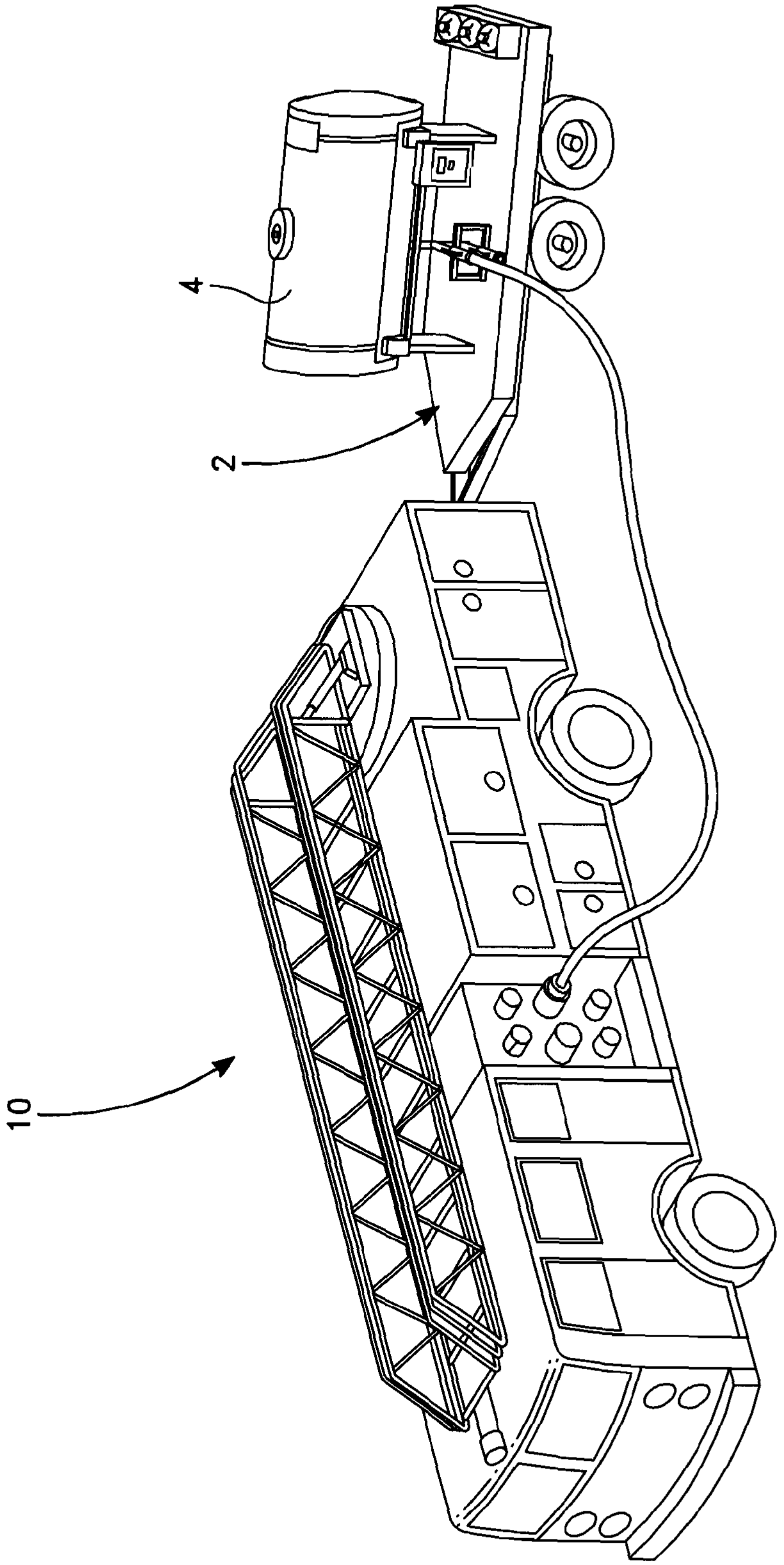
FIG. 1 is a side perspective view of an embodiment of an Automotive Fire Apparatus Vehicle (AFAV) pipingly connected to a first ball valve on an embodiment of a trailer.

Referring first to FIG. 1, embodiments of the invention are adapted to test an AFAV's foam delivery system, which includes the delivery system's piping, valves, pump, proportioner, eductor, and nozzles, while minimizing the release of Aqueous Film Forming Foam (AFFF) to the environment. An environmentally benign surrogate fluid is used for testing, enabling a user to validate the readiness of the vehicle's fire fighting equipment. The NoFoam system complies with the National Fire Protection Association (NFPA) 412.

With reference to FIG. 1, system embodiments include a trailer/stationary-pad 2 which allows the user to transport the system 10 to a location at a facility where fire fighting vehicles are normally tested. Trailer/stationary-pad 2 has a water tank 4 mounted thereon. The water tank 4 is (at least partially) filled with water to test the AFAV's foam delivery system. A fluorescent yellow/green dye or any other color dye is then added to the water which results in a highly visible dye-water flowing from the water tank 4. The color of the dye added is at user discretion.

Figure 6:
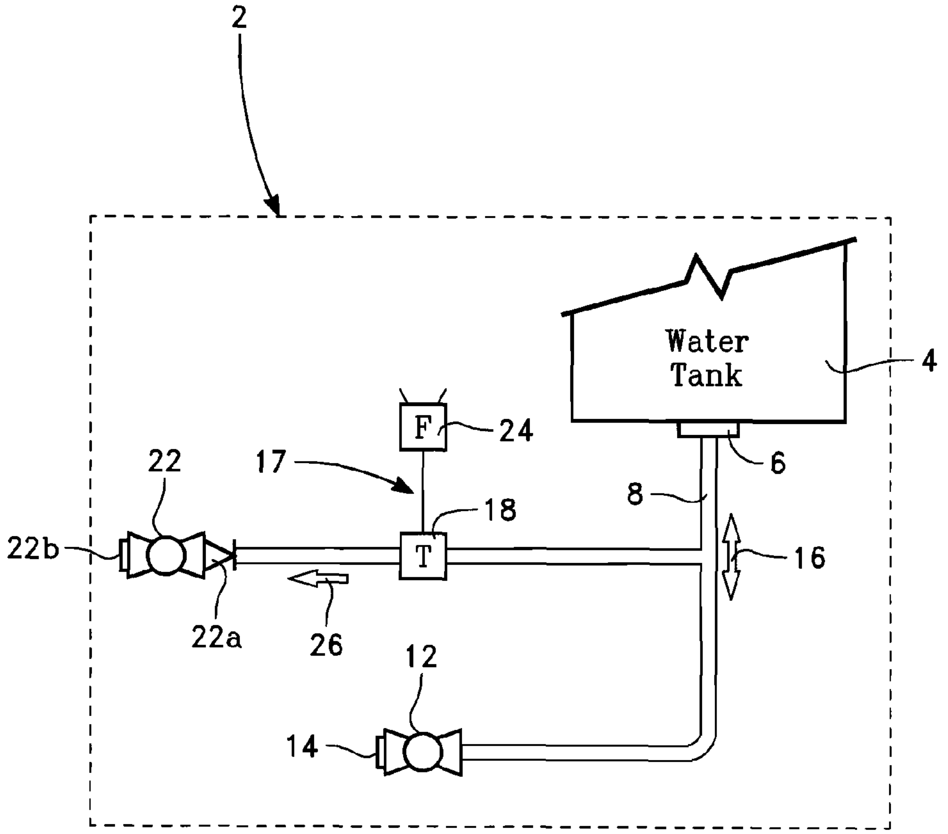
FIG. 6 illustrates a fluid flow diagram for an embodiment of a stationary pad/trailer.

With reference to FIG. 6, the water tank 4 includes an opening or discharge port 6 at its bottom end. The discharge port 6 is pipingly connected to a first inlet/outlet port of first ball valve 22. A user can connect a hose to fill valve 12 to drain and/or fill the water tank 4. Arrow 26 indicates direction of fluid flow through the flow sensor 17. Note that the phrase "pipingly connected" is used in this specification, including the claims, to describe a connection that is made via the use of a piping capable of providing sufficient flow. Some of the pipings are existing piping within the AFAV, some are new piping, and some are flexible hoses.

A flow sensor 17 is located on the mobile platform and is pipingly connected to the inlet/outlet port 6 of the surrogate fluid storage tank 4; the flow sensor 17 provides a measurement of a fluid flow rate of the surrogate fluid through the flow sensor 17. In some embodiments, the flow sensor 17 includes a paddle wheel flow transmitter 18 and a flow indicator 24 electrically associated with the transmitter 18. A flow indicator 24 for sensor 17, which is electrically connected to transmitter 18, allows the user to observe the flow rate of dye-water from tank 4.

A first ball valve 22 is located on the mobile platform; the first ball valve 22 has a first inlet port 22*a* pipingly connected to the flow sensor 17 and an outlet port 22*b*. In some embodiments, the first inlet port 22*a* of the first ball valve 22 is pipingly connected to a paddle wheel flow transmitter 18 of the flow sensor 17. The direction of dye-water flow through the flow sensor 17 is indicated by arrow 26.

System and method embodiments are described with reference to one of three general embodiments of pumper trucks—a single tank pumper truck, a first multi tank pumper truck, and a second multi tank pumper truck.

Single Tank Pumper Truck Embodiments

Figure 2:
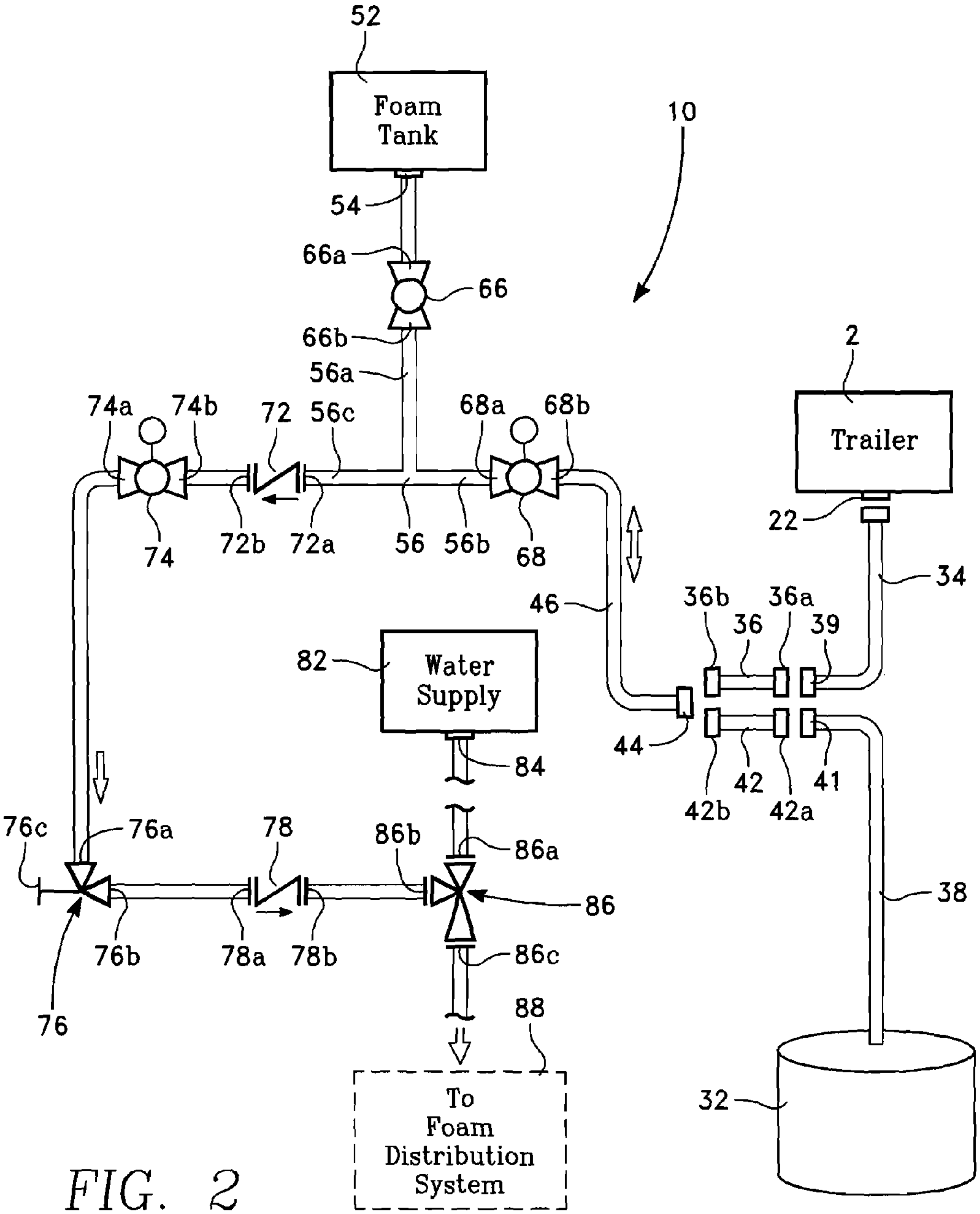
FIG. 2 illustrates a fluid flow schematic diagram of an embodiment of a system used on an embodiment of a single tank AFAV.

With reference to FIG. 2, some single tank pumper truck system embodiments further (further with respect to the trailer components illustrated in FIG. 6) include a foam concentrate storage bottle 32 to receive AFFF concentrate from the fire fighting vehicle.

These embodiments further include a first flexible hose 34 having a first end connected to the outlet port of the first ball valve 22. The first flexible hose 34 is dimensioned and configured to serve as a fluid piping between the surrogate liquid tank and the flow piping 46. In some embodiments, the first flexible hose has an internal diameter between and including 1 and 1.5 inches; however, any hose sufficiently configured and dimensioned to serve as piping for the surrogate fluid during testing conditions intended to replicate foam distribution system usage during a firefighting mission (to ensure correct operation of the foam distribution system) may be used.

These embodiments further include a first universal adapter fitting 36 having a first port 36*a* and a second port 36*b*, with the first port 36*a* being connected to a standard fitting 39 connected to a second end of the first flexible hose 34. The second port 36*b* is adapted and configured to engage with a fitting connector 44.

These embodiments further include a second flexible hose 38 having a first end connected to the foam concentrate storage bottle 32. In some embodiments, the second flexible hose 38 has an internal diameter between and including 1 and 1.5 inches; however, any hose sufficiently configured and dimensioned to serve as piping for residual foam to be discharged may be used.

These embodiments further include a second universal adapter fitting 42 having a first port 42*a* and a second port 42*b*, where the first port 42*a* of the second universal adapter fitting 42 is connected to a standard fitting 41 connected to a second end of the second flexible hose 38. The second port 42*b* is configured and dimensioned to engage with a fitting connector 44.

These embodiments further include a fitting connector 44 connected to a first end of a flow piping 46 and adapted to removably connect to the second port 36*b* of the first universal adapter fitting 36 and the second port 42*b* of the second universal adapter fitting 42.

These embodiments further include a foam storage tank 52, having a discharge port 54, located on the fire fighting vehicle.

These embodiments further include a T 56 having a first end 56*a*, a second end 56*b*, and a third end 56*c*. The T 56 can be formed of multiple sections attached to form a single T or it can be formed as a single piece.

These embodiments further include an isolation valve 66 having an inlet port 66*a* and an outlet port 66*b*, where the inlet port 66*a* of the isolation valve 66 is pipingly connected to the discharge port 54 of the foam storage tank 52, and the outlet port 66*b* of the isolation valve 66 is connected to the first end of the T 56.

These embodiments further include a drain valve 68 having a remote operator, a first inlet/outlet port 68*a*, and a second inlet/outlet port 68*b*. The first inlet/outlet port 68*a* of the drain valve 68 is connected to the second end 56*b* of the T 56 and the second end of the flow piping 46 is connected to the second inlet/outlet port 68*b* of the drain valve 68.

These embodiments further include a first spring check valve 72 having an inlet port 72*a* and an outlet port 72*b*, where the inlet port 72*a* of the spring check valve 72 is pipingly connected to the third end 56*c* of the T 56.

These embodiments further include a second ball valve 74 having an inlet port 74*b* and an outlet port 74*a*, where the inlet port 74*b* of the second ball valve 74 is pipingly connected to the first spring check valve outlet port 74*a*.

These embodiments further include a metering valve 76 located on the fire fighting vehicle; the metering valve 76 has an outlet port 76*b* and an inlet port 76*a*, where the inlet port 76*a* of the metering valve is pipingly connected to the outlet port 74*a* of the second ball valve 74. The metering valve 76 controls a flow rate of the surrogate fluid from the second ball valve through the metering valve 76 when the foam free system is testing the foam delivery system on the fire fighting vehicle.

These embodiments further include a second spring check valve 78 having a second spring check valve inlet port 78*a* and a second spring check valve outlet port 78, where the inlet port 78*a* of the second spring check valve 78 is pipingly connected to the outlet port 76*b* of the metering valve 76.

These embodiments further include a supply tank 82 to provide a pressurized liquid; the supply tank has an outlet port 84.

These embodiments further include an eductor 86 located on the fire fighting vehicle. The eductor 86 has a first inlet port 86*a* pipingly connected to the outlet port 84 of the supply tank 82, a second inlet port 86*b* pipingly connected to the second spring check valve outlet port 78*b*, and a discharge port 86*c*. The eductor 86 receives pressurized liquid from the supply tank 82, creating a vacuum within the eductor 86 that draws the surrogate fluid into the eductor 86. The eductor 86 mixes the surrogate fluid with the pressurized liquid to form a surrogate fluid mixture under pressure. The eductor 86 discharges the surrogate fluid mixture through the discharge port 86*c* of the eductor 86 to a plurality of nozzles 88 located on the fire fighting vehicle.

With reference to FIGS. 2 and 6, when discharging residual foam, in operation, the first ball valve 22, the isolation valve 66, and the second ball valve 74 are closed, and the second flexible hose 38 is connected to the flow piping 46, while the drain valve 68 is open, when the foam free system is discharging residual foam in the system to the foam concentrate storage bottle 32 (where the second flexible hose is connected to the flow piping via engagement of the second universal adapter fitting and the fitting connector).

With reference to FIGS. 2 and 6, in operation, when testing the foam distribution system, the isolation valve 66 is closed and the first flexible hose 34 is connected to the flow piping 46 while the first ball valve 22, the drain valve 68, and the second ball valve 74 are open, when the foam free system is testing the foam delivery system 88 allowing the surrogate fluid to flow through the first ball valve 22, the drain valve 68, and the second ball valve 74 (where the first flexible hose is connected to the flow piping via engagement of the first universal adapter fitting and the fitting connector).

In some of these embodiments, as exemplarily illustrated, the foam storage tank is located on the fire fighting vehicle.

Figure 5:
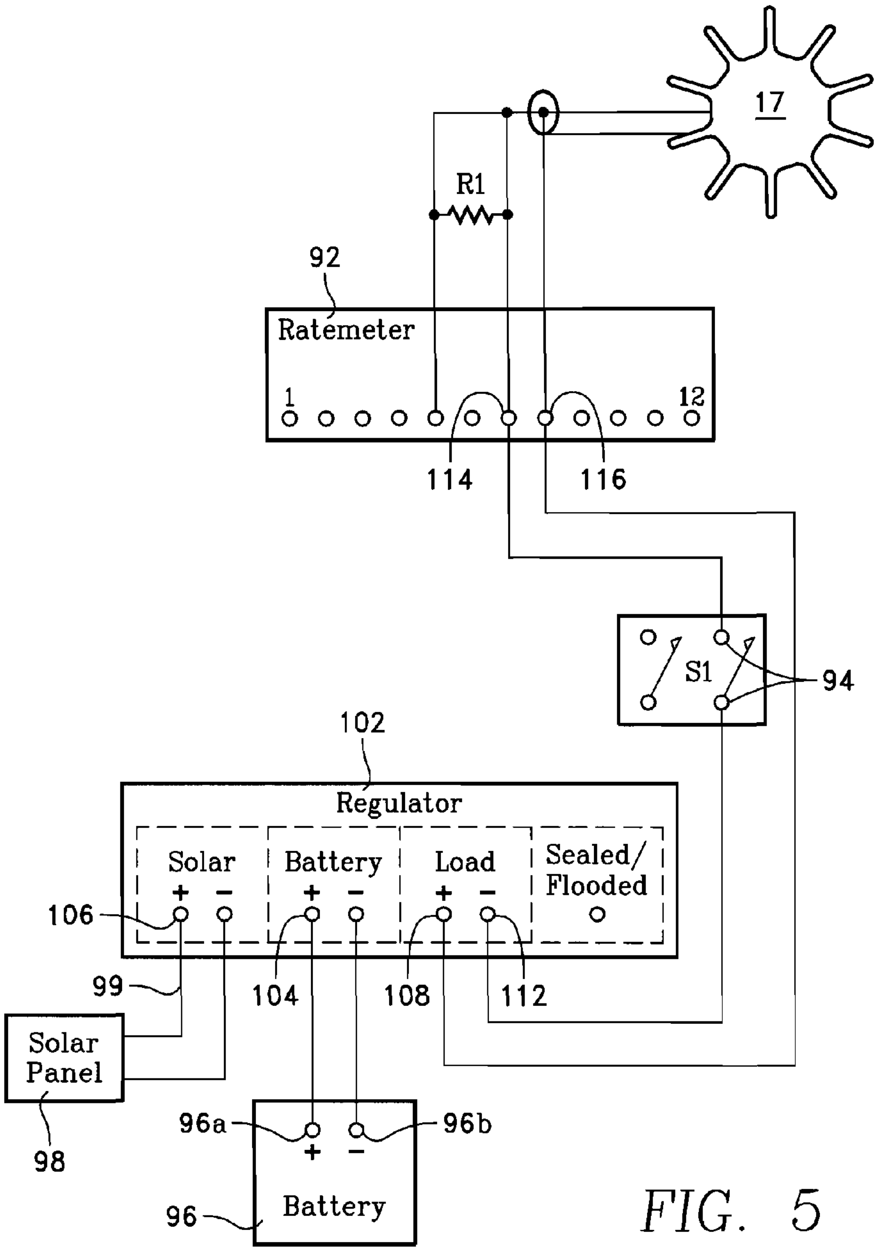
FIG. 5 illustrates a schematic diagram of an electrical circuit used in some embodiments of a system constructed in accordance with the principles of the invention.

With reference to FIG. 5, some of these embodiments further include a ratemeter 92, a switch 94 having at least one contact open under no bias 94, a battery 96 having a positive terminal 96*a* and a negative terminal 96*b*, a solar panel 98 having an output 99, and a voltage regulator 102 having a first positive 104 terminal electrically connected to the positive terminal 96*a* of the battery 96, a second positive terminal 106 electrically connected to the output of the solar panel 99, a load negative terminal 112 electrically connected to the normally open contact of the switch 94. The normally open contact of the switch 94 is electrically connected to the ratemeter 92. The ratemeter 92 has an output terminal 114 connected to an electrical input of the flow sensor 17. The flow sensor has an output connected to an input of the ratemeter.

In some of these embodiments, the surrogate fluid mixture includes an environmentally benign, biodegradable dye.

With reference to FIG. 2, in some of these embodiments, the flow rate of the surrogate fluid through the metering valve 76 is varied when a user is using the foam free system to test a plurality of nozzles 88 on the fire fighting vehicle which include roof turrets and handline nozzles.

With reference to FIGS. 2 and 6, method embodiments of environmentally safe testing of a foam delivery system on these embodiments of a single tank pumper truck fire fighting vehicle include:

providing a mobile platform 2 adapted for movement to a location having the fire fighting vehicle, the mobile platform 2 including a surrogate fluid storage tank 4 and a first ball valve 22 pipingly connected to the surrogate fluid storage tank 4, the surrogate fluid storage tank 4 housing an environmentally safe surrogate fluid;

transporting the mobile platform 2 to the location of the fire fighting vehicle to conduct a test of the foam delivery system 88 on the fire fighting vehicle;

connecting one end of a first flexible hose 34 to an outlet port of the first ball valve 22;

connecting an opposite end of the first flexible hose 34 to a first port of a first universal adapter 36;

connecting a second port of the first universal adapter 36 fitting to a fitting connector 44 pipingly connected to a drain valve 68;

closing an isolation valve 66 located on the fire fighting vehicle to prevent Aqueous Film Forming Foam (AFFF) from a foam tank 52 on the fire fighting vehicle from passing through a second ball valve 74 into the foam delivery system 88 on the fire fighting vehicle;

allowing the surrogate fluid to flow from the surrogate fluid storage tank 4 into the foam delivery system 88 on the fire fighting vehicle by opening the first ball 22 valve, the drain valve 68, and the second ball valve 74, where the second ball valve is pipingly located down line of a third end of a T, and where a first end of the T is connected to the foam tank and a second end of the T is connected to the inlet port of the drain valve 68;

controlling a flow rate of the surrogate fluid through the foam delivery system 88 by using a metering valve 76 pipingly connected to the second ball valve 74 on the fire fighting vehicle;

providing an environmentally safe pressurized liquid to the foam delivery system 88 on the fire fighting vehicle;

mixing the surrogate fluid with the pressurized liquid to form a surrogate fluid mixture under pressure, the surrogate fluid mixture being formed by an eductor 86 located on the fire fighting vehicle and connected to the metering valve 76;

providing the surrogate fluid mixture to at least one nozzle of the foam delivery system 88 located on the fire fighting vehicle under pressure testing each of the plurality of nozzles with the surrogate fluid mixture; and measuring the flow rate of the surrogate fluid from the surrogate fluid storage tank 4 with a flow sensor 17 located on the mobile platform.

In some of these embodiments, the flow sensor 17 is connected to a source of electrical power. In some of these embodiments the source of electrical power includes a voltage regulator connected to the flow indicator, and a solar panel and a battery connected to the voltage regulator.

Multi Tank Pumper Truck Embodiments 1

Figure 3:
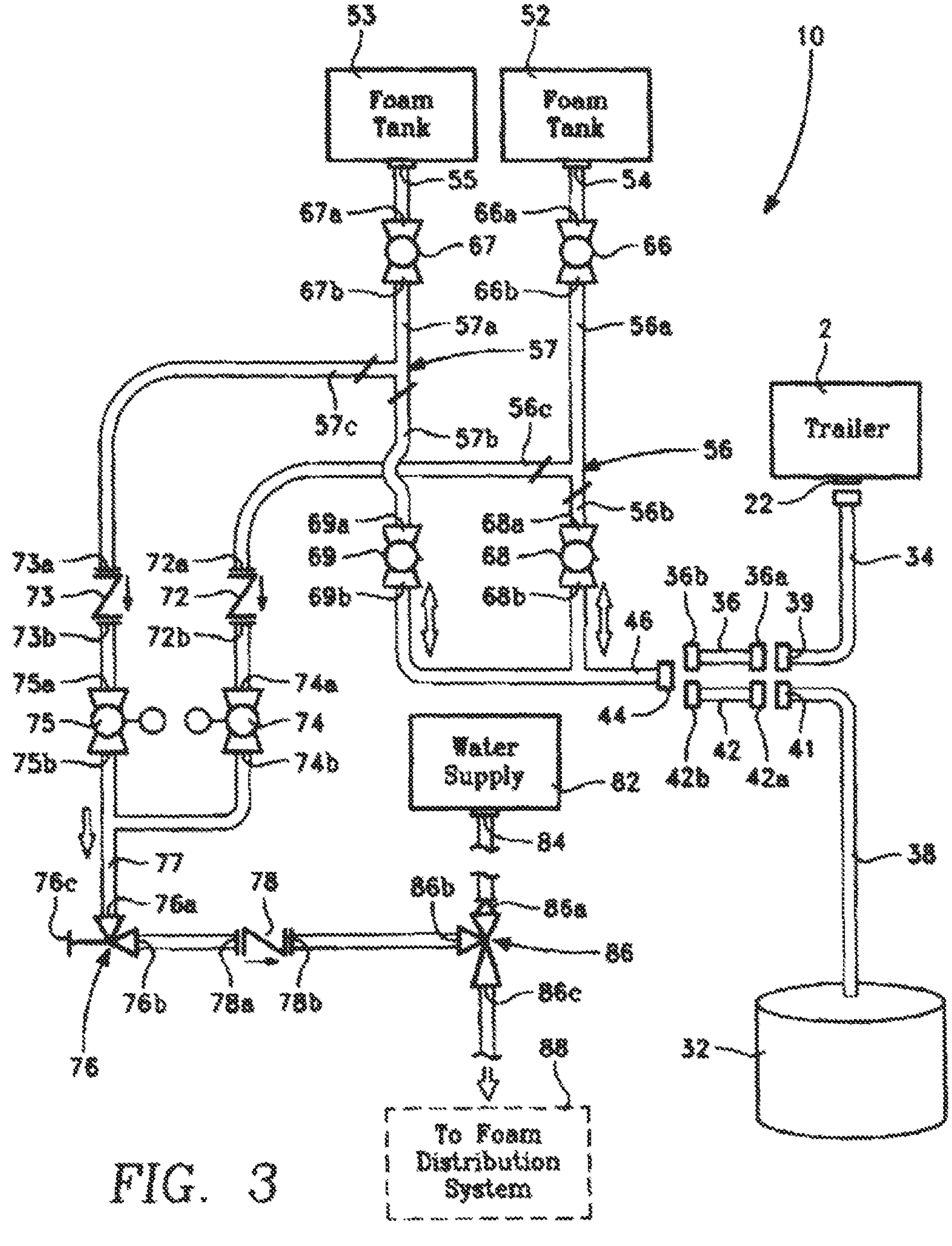
FIG. 3 illustrates a fluid flow schematic diagram of an embodiment of a system used on an embodiment of a multi tank AFAV.

With reference to FIG. 3, these embodiments further (further with respect to the trailer components illustrated in FIG. 6) include a foam concentrate storage bottle 32 to receive AFFF concentrate from the fire fighting vehicle.

These embodiments further include a first flexible hose 34 having a first end connected to the outlet port of the first ball valve 22. The first flexible hose 34 is dimensioned and configured to serve as a piping between the surrogate liquid tank and the flow piping 46. In some embodiments, the first flexible hose has an internal diameter between and including 1 and 1.5 inches; however, any hose sufficiently configured and dimensioned to serve as piping for the surrogate fluid during testing conditions intended to replicate foam distribution system usage during a firefighting mission (to ensure correct operation of the foam distribution system) may be used.

These embodiments further include a first universal adapter fitting 36 having a first port **36*a* and a second port 36*b*, with the first port 36*a* being connected to a standard fitting 39 connected to a second end of the first flexible hose 34. The second port 36*b* is adapted and configured to engage with a fitting connector 44**.

These embodiments further include a second flexible hose 38 having a first end connected to the foam concentrate storage bottle 32. In some embodiments, the second flexible hose 38 has an internal diameter between and including 1 and 1.5 inches; however, any hose sufficiently configured and dimensioned to serve as piping for residual foam to be discharged may be used.

These embodiments further include a second universal adapter fitting 42 having a first port **42*a* and a second port 42*b*, where the first port 42*a* of the second universal adapter fitting 42 is connected to a standard fitting 41 connected to a second end of the second flexible hose 38. The second port 42*b* is configured and dimensioned to engage with a fitting connector 44**.

These embodiments further include a fitting connector 44 connected to a first end of a flow piping 46 and adapted to removably connect to the second port **36*b* of the first universal adapter fitting 36 and the second port 42*b* of the second universal adapter fitting 42**.

These embodiments further include a first foam storage tank 52 having a discharge port 54 and a second foam storage tank 53 having a discharge port 55.

These embodiments further include a first T 56 having a first end, a second end, and a third end.

These embodiments further include a second T 57 having a first end, a second end, and a third end.

These embodiments further include a first isolation valve 66 associated with the AFAV; the first isolation valve 66 has an inlet port **66*a* pipingly connected to the discharge port 54 of the first foam storage tank 52. The first isolation valve has its outlet port 66*b* connected to the first end 56*a* of the first T 56**.

These embodiments further include a second isolation valve 67 associated with the AFAV; the second isolation valve 67 has an inlet port **67*a* pipingly connected to the discharge port 55 of the second foam storage tank 53. The second isolation valve has its outlet port 67*b* connected to the first end 57*a* of the second T 57**.

These embodiments further include a first drain valve 68; the first drain valve 68 has a first inlet/outlet port **68*a* and a second inlet/outlet port 68*b*, where the first inlet/outlet port 68*a* of the first drain valve 68 is pipingly connected to the second end 56*b* of the first T 56 and the second inlet/outlet port 68*b* of the first drain valve 68 is pipingly connected to the flow piping 46**.

These embodiments further include a second drain valve 69; the second drain valve has a first inlet/outlet port **69*a* and a second inlet/outlet port 69*b*, where the first inlet/outlet port 69*a* of the second drain valve 69 is pipingly connected to the second end 57*b* of the second T 57 and the second inlet/outlet port 69*b* of the second drain valve 69 is pipingly connected to the flow piping 46**.

These embodiments further include a first spring check valve 72 having an inlet port **72*a* and an outlet port 72*b*, where the inlet port 72*a* of the first spring check valve 72 is pipingly connected to the third end 56*c* of the first T 56**.

These embodiments further include a second spring check valve 73 having an inlet port **73*a* and an outlet port 73*b*, where the inlet port 73*a* of the second spring check valve 73 is pipingly connected to the third end 57*c* of the second T 57**.

These embodiments further include a second ball valve 74 having an inlet port **74*a* and an outlet port 74*b*, where the second ball valve 74 inlet port 74***a* is pipingly connected to the first spring check valve 72 outlet port 72*b*.

These embodiments further include a third ball valve 75 having an inlet port 75*a* and an outlet port 75*b*, where the third ball valve 75 inlet port 75*a* is pipingly connected to the second spring check valve 73 outlet port 73*b*.

These embodiments further include a metering valve inlet line 77, where the metering valve inlet line 77 is pipingly connected to the outlet port 74*b* of the second ball valve 74 and the outlet port 75*b* of the third ball valve 75.

These embodiments further include a metering valve 76 located on the fire fighting vehicle; the metering valve 76 has an inlet port 76*a* and an outlet port 76*b*, where the metering valve 76 inlet port 76*a* is connected to the metering valve 76 inlet line 77. The metering valve 76 controls a flow rate of the surrogate fluid from the second and third ball valve through the metering valve 76 when the foam free system is testing the foam delivery system on the fire fighting vehicle.

These embodiments further include a third spring check valve 78 having a third spring check valve 78 inlet port 78*a* and a third spring check valve 78 outlet port 78*b*, where the third spring check valve 78 inlet port 78*a* is pipingly connected to the metering valve 76 outlet port 76*b*.

These embodiments further include a supply tank 82 to provide a pressurized liquid. The supply tank 82 has an outlet port 84.

These embodiments further include an eductor 86 located on the fire fighting vehicle; the eductor 86 has a first inlet port 86*a* pipingly connected to the outlet port 84 of the supply tank 82, a second inlet port 86*b* pipingly connected to the third spring check valve 78 outlet port 78*b*, and a discharge port 86*c* pipingly connected to the fire fighting vehicle's foam distribution system. The eductor 86 receives the pressurized liquid from the supply tank 82 (via a pump—not illustrated); the pressurized liquid creates a vacuum within the eductor 86 that draws the surrogate fluid into the eductor 86. The eductor 86 mixes the surrogate fluid with the pressurized liquid to form a surrogate fluid mixture under pressure. The eductor 86 discharges the surrogate fluid mixture through the discharge port 86*c* of the eductor 86 to a plurality of nozzles located on the fire fighting vehicle.

In operation, when the system is discharging residual foam into the foam concentrate storage bottle 32, the first ball valve 22, the first and second isolation valves 66, 67, and the second and third ball valves 74, 75 are closed, and the second flexible hose 38 is connected to the flow piping 46, while the first and second drain valves 68, 69 are open. The second flexible hose 38 is connected to the flow piping 46 via engagement of the second universal adapter fitting 42 and the fitting connector 44.

In operation, when the foam free system is testing the foam delivery system allowing the surrogate fluid to flow through the first ball valve, the drain valves, and the second and third ball valves, the first and second isolation valves 66, 67 are closed and the first flexible hose 34 is connected to the flow piping 46 while the first ball valve 22 the first and second drain valves 68, 69 and the second and third ball valves 74, 75 are open. The first flexible hose 34 is connected to the flow piping 46 via engagement of the first universal adapter fitting 36 and the fitting connector 44.

In some of these embodiments, as exemplarily illustrated, the foam storage tank is located on the fire fighting vehicle.

With reference to FIG. 5, some of these embodiments further include a ratemeter 92, a switch 94 having at least one contact open under no bias 95, a battery 96 having a positive terminal 96*a* and a negative terminal 96*b*, a solar panel 98 having an output 99, and a voltage regulator 102 having a first positive 104 terminal electrically connected to the positive terminal 96*a* of the battery 96, a second positive terminal 106 electrically connected to the output of the solar panel 99, a load negative terminal 112 electrically connected to the normally open contact of the switch 95. The normally open contact of the switch 95 is electrically connected to the ratemeter 92. The ratemeter 92 has an input terminal 114 connected to an electrical output of the flow sensor 17. The flow sensor has an output connected to an input of the ratemeter.

In some of these embodiments, the surrogate fluid mixture includes an environmentally benign, biodegradable dye.

With reference to FIG. 2, in some of these embodiments, the flow rate of the surrogate fluid through the metering valve 76 is varied when a user is using the foam free system to test a plurality of nozzles 88 on the fire fighting vehicle which include roof turrets and handline nozzles.

With reference to FIGS. 3 and 6, method embodiments of environmentally safe testing of a foam delivery system on these embodiments of a multi tank pumper truck fire fighting vehicle include:

- providing a mobile platform 2 adapted for movement to a location having the fire fighting vehicle, the mobile platform including a surrogate fluid storage tank 4 and a first ball valve 22 pipingly connected to the surrogate fluid storage tank 4, the surrogate fluid storage tank 4 housing an environmentally safe surrogate fluid;
- transporting the mobile platform 2 to the location of the fire fighting vehicle to conduct a test of the foam delivery system 88 on the fire fighting vehicle;
- connecting one end of a first flexible hose 34 to an outlet port of the first ball valve 22;
- connecting an opposite end of the first flexible hose 34 to a first port of a first universal adapter 36;
- connecting a second port of the first universal adapter 36 to a fitting connector 44 pipingly connected to a first drain valve 68 and a second drain valve 69;
- preventing aqueous film forming foam from a first foam tank 52 on the fire fighting vehicle from passing through a first isolation valve 66 into the foam delivery system on the fire fighting vehicle by closing a first isolation valve 66 pipingly connected to a discharge port of the first foam tank 52;
- preventing aqueous film forming foam from a second foam tank 53 on the fire fighting vehicle from passing through a second isolation valve 67 into the foam delivery system 88 on the fire fighting vehicle by closing the second isolation valve 67 pipingly connected to a discharge port of the second foam tank 53;
- allowing the surrogate fluid to flow from the surrogate fluid storage tank 4 into the foam delivery system 88 on the fire fighting vehicle by opening the first ball valve 22, the first drain valve 68, the second drain valve 69, a second ball valve 74, and a third ball valve 75, where the first and second drain valve 68, 69 control flow through a flow piping through which the surrogate fluid passes during testing of the fire fighting system, where each of the second and third ball valve operate as a single directional flow valve to a metering valve inlet line;
- controlling a flow rate of the surrogate fluid through the foam delivery system 88 by using a metering valve 76 pipingly connected to the second ball valve 74 and the third ball valve 75 on the fire fighting vehicle;
- providing an environmentally safe pressurized liquid to the foam delivery system 88 on the fire fighting vehicle;
- mixing the surrogate fluid with the pressurized liquid to form a surrogate fluid mixture under pressure, the surrogate fluid mixture being formed by an eductor 86 located on the fire fighting vehicle and connected to the metering valve 76;

providing the surrogate fluid mixture to a plurality of nozzles located on the fire fighting vehicle under pressure testing each of the plurality of nozzles with the surrogate fluid mixture; and measuring the flow rate of the surrogate fluid from the surrogate fluid storage tank with a flow sensor located on the mobile platform 2.

Some embodiments of methods of testing these multi tank pumper truck embodiments include the flow indicator being connected to a source of electrical power. In some of these embodiments, source of electrical power includes a voltage regulator connected to the flow indicator, and a solar panel and a battery connected to the voltage regulator.

Multi Tank Pumper Truck Embodiments 2

Figure 4:
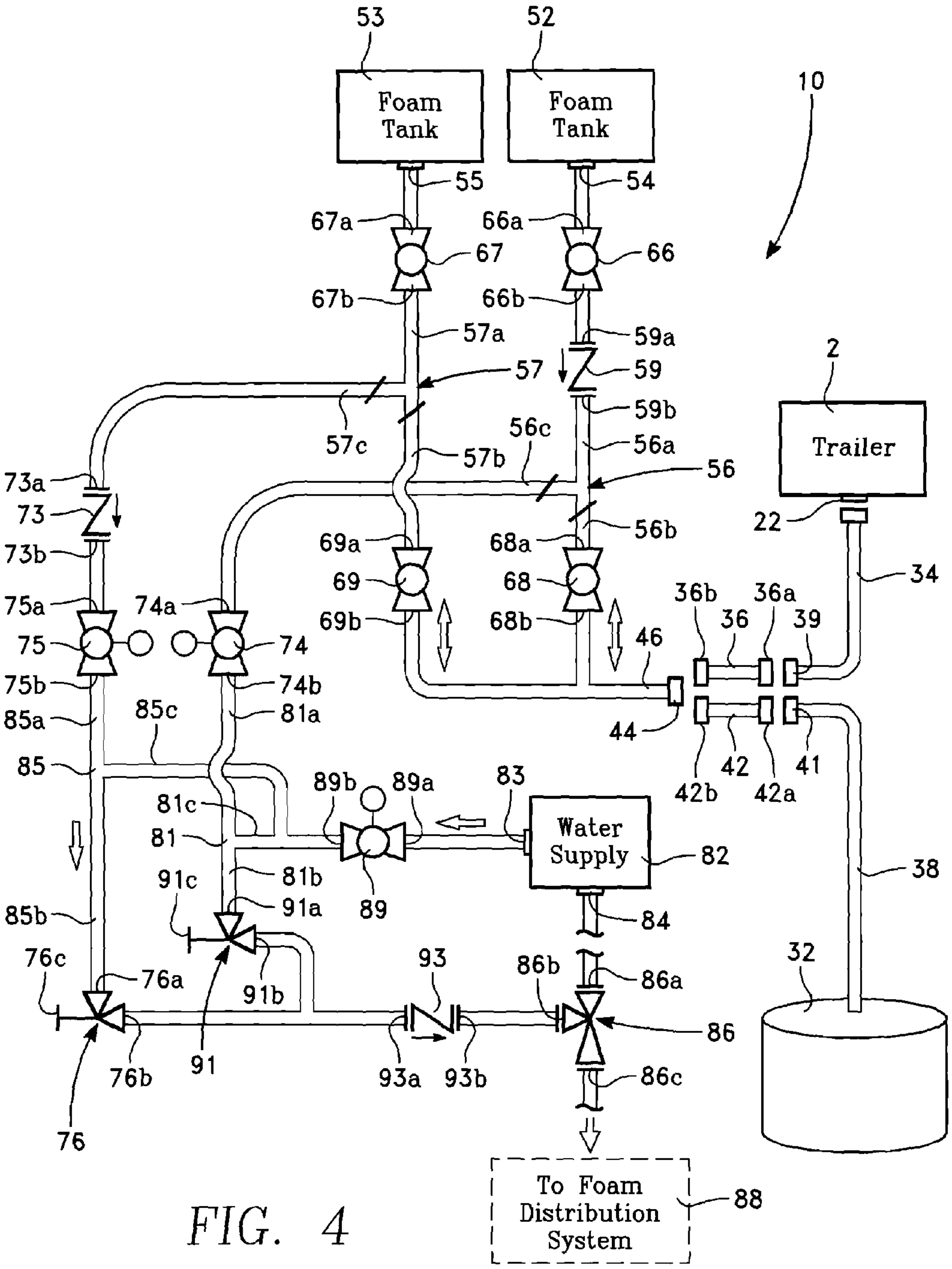
FIG. 4 illustrates a fluid flow schematic diagram of an embodiment of a system used on an embodiment of a multi tank AFAV.

With reference to FIG. 4, these embodiments further (further with respect to the trailer components illustrated in FIG. 6) include a foam concentrate storage bottle 32 to receive AFFF concentrate from the fire fighting vehicle.

These embodiments further include a first flexible hose 34 having a first end connected to the outlet port of the first ball valve 22.

These embodiments further include a first universal adapter fitting 36 having a first port 36*a* and a second port 36*b*, with the first port 36*a* being connected to a second end of the first flexible hose 34.

These embodiments further include a second flexible hose 38 having a first end connected to the foam concentrate storage bottle 32.

These embodiments further include a second universal adapter fitting 42 having a first port 42*a* and a second port 42*b*; the first port 42*a* of the second universal adapter fitting 42 is connected to a second end of the second flexible hose 38.

These embodiments further include a flow piping 46.

These embodiments further include a fitting connector 44 connected to a first end of the flow piping 46 and adapted to removably connect to the second port 36*b* of the first universal adapter fitting 36 and the second port 42*b* of the second universal adapter fitting 42.

These embodiments further include a first T 56 having a first end 56*a*, a second end 56*b*, and a third end 56*c*.

These embodiments further include a second T 57 having a first end 57*a*, a second end 57*b*, and a third end 57*c*.

These embodiments further include a first isolation valve 66 associated with the AFAV; the first isolation valve 66 has an inlet port 66*a* pipingly connected to the discharge port 54 of the first foam storage tank 52.

These embodiments further include a second isolation valve 67 associated with the AFAV; the second isolation valve has an inlet port 67*a* pipingly connected to the discharge port 55 of the second foam storage tank 53.

These embodiments further include a first drain valve 68. The first drain valve 68 has an inlet port 68*a* and an outlet port 68*b*, where the inlet port 68*a* of the first drain valve 68 is connected to the second end 56*b* of the first T 56 and the outlet port 68*b* of the first drain valve 68 is pipingly connected to the flow piping 46.

These embodiments further include a second drain valve 69. The second drain valve has an inlet port 69*a* and an outlet port 69*b*, where the inlet port 69*a* of the second drain valve 69 is connected to the second end 57*b* of the second T 57 and the outlet port 69*b* of the second drain valve 69 is pipingly connected to the flow piping 46.

These embodiments further include a first spring check valve 59 having an inlet port 59*a* and an outlet port 59*b*, where the inlet port 59*a* of the first spring check valve 59 is pipingly connected to the outlet port 66*b* of the first isolation valve 66, and the outlet port 59*b* of the first spring check valve 59 is connected to the first end 56*a* of the first T 56.

These embodiments further include a second spring check valve 73 having an inlet port 73*a* and an outlet port 73*b*, where the inlet port 73*a* of the second spring check valve 73 is connected to the third end 57*c* of the second T 57.

These embodiments further include a second ball valve 74 having an inlet port 74*a* and an outlet port 74*b*, where the second ball valve 74 inlet port 74*a* is pipingly connected to the third end 56*c* of the first T 56.

These embodiments further include a third ball valve 75 having an inlet port 75*a* and an outlet port 75*b*, where the third ball valve 75 inlet port 75*a* is pipingly connected to the outlet port 73*b* of the second spring check valve 73.

These embodiments further include a third T 81 having a first end 81*a*, a second end 81*b*, and a third end 81*c*; the first end 81*a* of the third T 81 is connected to the outlet port 74*b* of the second ball valve 74.

These embodiments include a fourth T 85 having a first end 85*a*, a second end 85*b*, and a third end 85*c*; the first end 85*a* of the fourth T 85 is connected to the outlet port 75*b* of the third ball valve 75.

These embodiments further include a first metering valve 91 located on the fire fighting vehicle; the first metering valve 91 has an inlet port 91*a*, and an outlet port 91*b*, where the first metering valve 91 inlet port 91*a* is pipingly connected to the second end 81*b* of the third T 81. The first metering valve controls a flow rate of the surrogate fluid from the second and third ball valve(s) through the metering valve when the foam free system is testing the foam delivery system on the fire fighting vehicle;

These embodiments include a second metering valve 76 located on the fire fighting vehicle; the first metering valve 76 has an inlet port 76*a* and an outlet port 76*b*, where the metering valve 76 inlet port 76*a* is pipingly connected to the second end 85*b* of the fourth T 85.

These embodiments further include a supply tank 82 to provide a pressurized liquid; the supply tank 82 has a first outlet port 83 and a second outlet port 84.

These embodiments further include a flush valve 89 having an inlet port 89*a* and an outlet port 89*b*; the outlet port of the flush valve 89 is pipingly connected to the third end 81*c* of the third T 81 and the third end 85*c* of the fourth T 85. The inlet port 89*a* of the flush valve 89 being pipingly connected to the first outlet port 83 of the supply tank 82.

These embodiments further include a third spring check valve 93 having a third spring check valve inlet port 93*a* and a third spring check valve outlet port 93*b*, where the third spring check valve inlet port 93*a* is pipingly connected to the first metering valve outlet port 91*b* and the second metering valve outlet port 76*b*.

These embodiments further include an eductor 86 located on the fire fighting vehicle; the eductor 86 has a first inlet port 86*a* connected to the second outlet port 84 of the supply tank 82, a second inlet port 86*b* pipingly connected to the third spring check valve outlet port 93*b*, and a discharge port 86*c*. The eductor 86 receives the pressurized liquid from the supply tank 82 and the pressurized liquid creates a vacuum within the eductor 86 that draws the surrogate fluid into the eductor 86. The eductor 86 mixes the surrogate fluid with the pressurized liquid to form a surrogate fluid mixture under pressure; the eductor 86 discharges the surrogate fluid mixture through the discharge port 86*c* of the eductor 86 to a plurality of nozzles located on the fire fighting vehicle.

In operation, when the foam free system is discharging residual foam in the system to the foam concentrate storage bottle, the first ball valve 22, the first and second isolation valves 66, 67, and the second and third ball valves 74, 75 being closed, and the second flexible hose 38 being connected to the flow piping 46, while the first and second drain valves 68, 69 are open, when the foam free system is discharging residual foam in the system to the foam concentrate storage bottle 32. The second flexible hose 38 is connected to the flow piping 46 via engagement of the second universal adapter fitting 42 and the fitting connector 44.

In operation, when the system is testing the foam delivery system allowing the surrogate fluid to flow through the first ball valve 22, the first and second drain valves 68, 69, and the second and third ball valves 74, 75 first and second isolation valves 66, 67 being closed and the first flexible hose 34 being connected to the flow piping 46 while the first ball valve 22 the first and second drain valves 68, 69 and the second and third ball valves 74, 75 are open. The first flexible hose 34 is connected to the flow piping 46 via engagement of the first universal adapter fitting 36 and the fitting connector 44.

Method embodiments of using these embodiments of foam distribution testing systems to test these embodiments of multi tank pumper trucks include:

- providing a mobile platform 2 adapted for movement to a location having the fire fighting vehicle, the mobile platform including a surrogate fluid storage tank 4 and a first ball valve 22 pipingly connected to the surrogate fluid storage tank 4, the surrogate fluid storage tank 4 housing an environmentally safe surrogate fluid;
- transporting the mobile platform 2 to the location of the fire fighting vehicle to conduct a test of the foam delivery system 88 on the fire fighting vehicle;
- connecting one end of a first flexible hose 34 to an outlet port of the first ball valve 22;
- connecting an opposite end of the first flexible hose 34 to a first port of a first universal adapter 36;
- connecting a second port of the first universal adapter fitting 36 to a fitting connector 44 pipingly connected to a first drain valve 68 and a second drain valve 69;
- preventing aqueous film forming foam from a first foam tank 52 on the fire fighting vehicle from passing through a first isolation valve 66 pipingly connected to a discharge port of the first foam tank 52 into the foam delivery system 88 on the fire fighting vehicle by closing the first isolation valve 66;
- preventing aqueous film forming foam from a second foam tank 53 on the fire fighting vehicle from passing through a second isolation valve 67 pipingly connected to a discharge port of the second foam tank 53 into the foam delivery system 88 on the fire fighting vehicle by closing the second isolation valve 67;
- allowing the surrogate fluid to flow from the surrogate fluid storage tank 4 into the foam delivery system 88 on the fire fighting vehicle by opening the first ball valve 22, the first drain valve 66, the second drain valve 67, a second ball valve, and a third ball valve, where the first and second drain valve control flow through a flow piping through which the surrogate fluid passes during testing of the fire fighting system, where the second ball valve and third ball valve operate as a single directional flow valve to a first metering valve and a second metering valve, respectively;
- controlling a flow rate of the surrogate fluid through the foam delivery system using the first metering valve and the second metering valve;

- providing an environmentally safe pressurized liquid to the foam delivery system on the fire fighting vehicle;
- mixing the surrogate fluid with the pressurized liquid to form a surrogate fluid mixture under pressure, the surrogate fluid mixture being formed by an eductor located on the fire fighting vehicle and pipingly connected to the first metering valve and the second metering valve;
- providing the surrogate fluid mixture to a plurality of nozzles located on the fire fighting vehicle under pressure testing each of the plurality of nozzles with the surrogate fluid mixture; and
- measuring the flow rate of the surrogate fluid from the surrogate fluid storage tank with a flow sensor located on the mobile platform.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A foam free fire fighting vehicle foam delivery test system, comprising:

- a foam concentrate storage bottle to receive AFFF concentrate from said fire fighting vehicle;
- a mobile platform adapted for movement to a location having said fire fighting vehicle;
- a surrogate fluid storage tank mounted on said mobile platform, said surrogate fluid storage tank housing an environmentally safe surrogate fluid, said surrogate fluid storage tank having an inlet/outlet port;
- a flow sensor located on said mobile platform and pipingly connected to the inlet/outlet port of said surrogate fluid storage tank, wherein said flow sensor provides a measurement of a fluid flow rate of said surrogate fluid through said flow sensor;
- a first ball valve located on said mobile platform, said first ball valve having an inlet port pipingly connected to said flow sensor and an outlet port;
- a first flexible hose having a first end connected to the outlet port of said first ball valve;
- a first universal adapter fitting having a first port and a second port, said first port being connected to a second end of said first flexible hose;
- a second flexible hose having a first end connected to said foam concentrate storage bottle;
- a second universal adapter fitting having a first port and a second port, wherein said first port of said second universal adapter fitting is connected to a second end of said second flexible hose;
- a fitting connector connected to a first end of a flow piping and adapted to removably connect to said second port of said first universal adapter fitting and said second port of said second universal adapter fitting;
- a foam storage tank having a discharge port;
- a T having a first end, a second end, and a third end;
- an isolation valve having an inlet port and an out let port, wherein the inlet port of said isolation valve is pipingly connected to said discharge port of said foam storage tank, and the outlet port of said isolation valve is connected to said first end of said T;
- a drain valve having a remote operator, a first inlet/outlet port, and a second inlet/outlet port, wherein the first inlet/outlet port of said drain valve is connected to the second end of said T and the second end of said flow piping is connected to the second inlet outlet port of said drain valve;

a first spring check valve having an inlet port and an outlet port, wherein the inlet port of said spring check valve is pipingly connected to said third end of said T;

a second ball valve having an inlet port and an outlet port, wherein the inlet port of said second ball valve is pipingly connected to said first spring check valve outlet port;

a metering valve located on said fire fighting vehicle, said metering valve having an outlet port and an inlet port, wherein the inlet port of said metering valve is connected to the outlet port of said second ball valve, said metering valve controlling a flow rate of said surrogate fluid from said second ball valve through said metering valve when said foam free system is testing the foam delivery system on said fire fighting vehicle;

a second spring check valve having a second spring cheek valve inlet port and a second spring check valve outlet port, wherein the inlet port of said second spring check valve is pipingly connected to the outlet port of said metering valve;

a supply tank to provide a pressurized liquid, said supply tank having an outlet port; and an eductor located on said fire fighting vehicle, said eductor having a first inlet port connected to the outlet port of said supply tank, a second inlet port connected to said second spring check valve outlet port, and a discharge port, said eductor receiving said pressurized liquid from said supply tank, said pressurized liquid creating a vacuum within said eductor that draws said surrogate fluid into said eductor, said eductor mixing said surrogate fluid with said pressurized liquid to form a surrogate fluid mixture under pressure, said eductor discharging said surrogate fluid mixture through the discharge port of said eductor to a plurality of nozzles located on said fire fighting vehicle;

said first ball valve, said isolation valve, and said second ball valve being closed, and said second flexible hose being connected to said flow piping, while said drain valve is open, when said foam free system is discharging residual foam in said system to said foam concentrate storage bottle, wherein said second flexible hose is connected to said flow piping via engagement of said second universal adapter fitting and said fitting connector; and said isolation valve being closed and said first flexible hose being connected to said flow piping while said first ball valve, said drain valve, and said second ball valve are open, when said foam free system is testing the foam delivery system allowing said surrogate fluid to flow trough said first ball valve, said drain valve, and said second bail valve, wherein said first flexible hose is connected to said flow piping via engagement of said first universal adapter fitting and said fitting connector.

2. The system of claim 1, wherein said flow sensor includes a paddle wheel flow transmitter and a flow indicator electrically connected to said paddle wheel flow transmitter.

3. The system of claim 1, wherein said foam storage tank is located on said fire fighting vehicle.

4. The system of claim 1, further comprising:

a ratemeter;

a switch having a normally open contact;

a battery having a positive terminal and a negative terminal;

a solar panel having an output;

a voltage regulator having a first positive terminal connected to said positive terminal of said battery, a second positive terminal connected to said output of said solar panel, a load positive terminal connected to said normally open contact of said switch; and wherein said normally open contact of said switch is connected to said ratemeter, wherein said ratemeter has an input terminal connected to an output of said peddle wheel flow sensor, and wherein said paddlewheel flow sensor has an output connected to an input of said ratemeter.

5. The system of claim 1, wherein said surrogate fluid mixture comprises a an environmentally benign, biodegradable dye.

6. The system of claim 1, wherein the flow rate of said surrogate fluid through said metering valve is varied when a user is using said foam free system to test a plurality of nozzles on said fire fighting vehicle, said plurality of nozzles including roof turrets and handline nozzles.

7. A foam free fire fighting vehicle foam delivery test system, comprising:

a foam concentrate storage bottle to receive AFFF concentrate from said fire fighting vehicle;

a mobile platform adapted for movement to a location having said fire fighting vehicle;

a surrogate fluid storage tank mounted on said mobile platform, said surrogate fluid storage tank housing an environmentally safe surrogate fluid, said surrogate fluid storage tank having an inlet/outlet port;

a flow sensor located on said mobile platform and pipingly connected to the inlet/outlet port of said surrogate fluid storage tank, wherein said flow sensor provides a measurement of a fluid flow rate of said surrogate fluid through said flow sensor;

a first ball valve located on said mobile platform, said first ball valve having an inlet port pipingly connected to said flow sensor and an outlet port;

a first flexible hose having a first end connected to the outlet port of said first ball valve;

a first universal adapter fitting having a first port and a second port, said first port being connected to a second end of said first flexible hose;

a second flexible hose having a first end connected to said foam concentrate storage bottle;

a second universal adapter fitting having a first port and a second port, said second universal adapter fitting first port being connected to a second end of said second flexible hose;

a flow piping;

a fitting connector connected to a first end of said flow piping and adapted to removably connect to said second port of said first universal adapter fitting and said second port of said second universal adapter fitting;

a first foam storage tank having a discharge port;

a second foam storage tank having a discharge port;

a first T having a first end, a second end, and a third end;

a second T having a first end, a second end, and a third end;

a first isolation valve associated with said fire fighting vehicle, said first isolation valve having an inlet ort port pipingly connected to said discharge port of said first foam storage tank; said first isolation valve having its outlet port connected to said first end of said first T;

a second isolation valve associated with said fire fighting vehicle, said second isolation valve having an inlet port pipingly connected to said discharge port of said second foam storage tank; said second isolation valve having its outlet port connected to said first end of said second T;

a first drain valve, said first drain valve having an inlet port and an outlet port, wherein the inlet port of said first drain valve is pipingly connected to the second end of said first T and said outlet port of said first drain valve is pipingly connected to said flow piping;

a second drain valve, said second drain valve having an inlet port and an outlet port, wherein the inlet port of said second drain valve is pipingly connected to the second end of said second T and said outlet port of said second drain valve is pipingly connected to said flow piping;

a first spring check valve having an inlet port and an outlet port, wherein the inlet port of said first spring check valve is pipingly connected to said third end of said first T;

a second spring check valve having an inlet port and an outlet port, wherein the inlet port of said second spring check valve is pipingly connected to said third end of said second T;

a second ball valve having an inlet port and an outlet port, wherein said second ball valve inlet port is pipingly connected to: said first spring check valve outlet port;

a third ball valve having an inlet port and an outlet port, wherein said third ball valve inlet port is pipingly connected to said second spring check valve outlet port;

a metering valve inlet line, wherein said metering valve inlet line is pipingly connected to the outlet port of said second ball valve and the outlet port of said third ball valve;

a metering valve located on said fire fighting vehicle, said metering valve having an inlet port and an outlet port, wherein said metering valve inlet port is connected to said metering valve inlet line, said metering valve controlling a flow rate of said surrogate fluid from said second and third ball valves through said metering valve when said foam free system is testing the foam delivery system on said fire fighting vehicle;

a third spring check valve having a third spring check valve inlet port and a third spring check valve outlet port, wherein said third spring check valve inlet port is pipingly connected to said metering valve outlet port;

a supply tank to provide a pressurized liquid, said supply tank having an outlet port; and an eductor located on said fire fighting vehicle, said eductor having a first inlet port connected to the outlet port of said supply tank, a second inlet port pipingly connected to said third spring check valve outlet port, and a discharge port, said eductor receiving said pressurized liquid from said supply tank, said pressurized liquid creating a vacuum within said eductor that draws said surrogate fluid into said eductor, said eductor mixing said surrogate fluid with said pressurized liquid to form a surrogate fluid mixture under pressure, said eductor discharging said surrogate fluid mixture through the discharge port of said eductor to a plurality of nozzles located on said fire fighting vehicle;

said first ball valve, said first and second isolation valves, and said second and third ball valves being closed, and said second flexible hose being connected to said flow piping, while said first and second drain valves are open, when said foam free system is discharging residual foam in said system to said foam concentrate storage bottle, wherein said second flexible hose being connected to said flow piping via engagement of said second universal adapter fitting and said fitting connector; and said first and second isolation valves being closed and said first flexible hose being connected to said flow piping while said first ball valve said drain valve and said second ball valve are open, when said foam free system is testing the foam delivery system allowing said surrogate fluid to flow through said first ball valve said drain valve and said second ball valve, wherein said first flexible hose is connected to said flow piping via engagement of said first universal adapter fitting and said fitting connector.

8. The system of claim 7, wherein said flow sensor includes a paddle wheel flow transmitter and a flow indicator electrically connected to said paddle wheel flow transmitter.

9. The system of claim 7, wherein said foam storage tank is located on said fire fighting vehicle.

10. The system of claim 7, further comprising:

a ratemeter;

a switch having a normally open contact;

a battery having a positive terminal and a negative terminal;

a solar panel having an output;

a voltage regulator having a first positive terminal connected to said positive terminal of said battery, a second positive terminal connected to said output of said solar panel, a load positive terminal connected to said normally open contact of said switch; and wherein said normally open contact of said switch is connected to said ratemeter, wherein said ratemeter has an input terminal connected to an output of said paddle wheel flow sensor, and wherein said paddlewheel flow sensor has an output connected to an input of said ratemeter.

11. The system of claim 7, wherein said surrogate fluid mixture comprises an environmentally benign, biodegradable dye.

12. The system of claim 7, wherein the flow rate of said surrogate fluid through said metering valve is varied when a user is using said foam free system to test a plurality of nozzles on said fire fighting vehicle, said plurality of nozzles including roof turrets and handline nozzles.

13. A foam free fire fighting vehicle foam delivery test system, comprising:

a foam concentrate storage bottle to receive AFFF concentrate from said fire fighting vehicle;

a mobile platform adapted for movement to a location having said fire fighting vehicle;

a surrogate fluid storage tank mounted on said mobile platform, said surrogate fluid storage tank housing an environmentally safe surrogate fluid, said surrogate fluid storage tank having an inlet/outlet port;

a first foam storage tank having a discharge port;

a second foam storage tank having a discharge port;

a flow sensor located on said mobile platform and pipingly connected to the inlet/outlet port of said surrogate fluid storage tank, wherein said flow sensor provides a measurement of a fluid flow rate of said surrogate fluid through said flow sensor;

a first ball valve located on said mobile platform, said first ball valve having an inlet port pipingly connected to said flow sensor and an outlet port;

a first flexible hose having a first end connected to the outlet port of said first ball valve;

a first universal adapter fitting having a first port and a second port, said first port being connected to a second end of said first flexible hose;

a second flexible hose having a first end connected to said foam concentrate storage bottle;

a second universal adapter fitting having a first port and a second port, said second universal adapter fitting first port being connected to a second end of said second flexible hose;

a flow piping;

a fitting connector connected to a first end of said flow piping and adapted to removably connect to said second port of said first universal adapter fitting and said second port of said second universal adapter fitting;

a first T having a first end, a second end, and a third end;

a second T having a first end, a second end, and a third end;

a first isolation valve associated with said fire fighting vehicles, said first isolation valve having an inlet port pipingly connected to said discharge port of said first foam storage tank;

a second isolation valve associated with said fire fighting vehicle, said second isolation valve having an inlet port pipingly connected to said discharge port of said second foam storage tank;

a first drain valve, said first drain valve having an inlet port and an outlet port, wherein the inlet port of said first drain valve is connected to the second end of said first T and said outlet port of said first drain valve is pipingly connected to said flow piping;

a second drain valve, said second drain valve having an inlet port and an outlet port, wherein the inlet port of said second drain valve is connected to the second end of said second T and said outlet port of said second drain valve is pipingly connected to said flow piping;

a first spring check valve having an inlet port and an outlet port, wherein the inlet port of said first spring check valve is pipingly connected to the outlet port of said first isolation valve, and said outlet port of said first spring check valve is connected to said first end of said first T;

a second spring check valve having an inlet port and an outlet port, wherein the inlet port of said second spring check valve is connected to the third end of said second T;

a second ball valve having an inlet port and an outlet port, wherein said second ball valve inlet port is pipingly connected to said third end of said first T;

a third ball valve having an inlet port and an outlet pot, wherein said third ball valve inlet port is pipingly connected to said outlet port of said second spring check valve;

a third T having a first end, a second end, and a third end, said first end of said third T being connected to the outlet port of said second ball valve;

a fourth T having a first end, a second end, and a third end, said first end of said fourth T being connected to the outlet port of said third ball valve;

a fifth T having a first end, a second end, and a third end;

a metering valve inlet line, wherein said metering valve inlet line is pipingly connected to the outlet port of said second ball valve and the outlet port of said third ball valve;

a first metering valve located on said fire fighting vehicle, said first metering valve having an inlet port and an outlet port, wherein said metering valve inlet port is pipingly connected to said second end of said third T, said metering valve controlling a flow rate of said surrogate fluid from said second and third ball valves through said metering valve when said foam free system is testing the foam delivery system on said fire fighting vehicle;

a second metering valve located on said fire fighting vehicle, said first metering valve having an inlet port and an outlet port, wherein said metering valve in et port is pipingly connected to said second end of said fourth T;

a supply tank to provide a pressurized liquid, said supply tank having a first outlet port and a second outlet port;

a flush valve having an inlet port and an outlet port; said inlet port of said flush valve being pipingly connected to said third end of said third T and said third end of said fourth T, and said outlet port of said flush valve being pipingly connected to said first outlet port of said supply tank;

a third spring check valve having a third spring check valve inlet port and a third spring check valve outlet port, wherein said third spring check valve inlet port is pipingly connected to said first metering valve outlet port and said second metering valve outlet port; and an eductor located on said fire fighting vehicle, said eductor having a first inlet port connected to said second outlet port of said supply tank, a second inlet port pipingly connected to said third spring check valve outlet port, and a discharge port, said eductor receiving said pressurized liquid from said supply tank, said pressurized liquid creating a vacuum within said eductor that draws said surrogate fluid into said eductor, said eductor mixing said surrogate fluid with said pressurized liquid to form a surrogate fluid mixture under pressure, said eductor discharging said surrogate fluid mixture through the discharge port of said eductor to a plurality of nozzles located on said fire fighting vehicle;

said first ball valve, said first and second isolation valves, and said second and third ball valves, being closed, and said second flexible hose being connected to said flow piping, while said first and second drain valves are open, when said foam free system is discharging residual foam in said system to said foam concentrate storage bottle, wherein said second flexible hose is connected to said flow piping via engagement of said second universal adapter fitting and said fitting connector; and said first and second isolation valves being closed and said first flexible hose being connected to said flow piping while said first ball valve said drain valve, said second ball valve, and said third ball valve are open, when said foam free system is testing the foam delivery system allowing said surrogate fluid to flow through said first ball valve said drain valve, said second ball valve, and said third ball valve, and wherein said first flexible hose is connected to said flow piping via engagement of said first universal adapter fitting and said fitting connector.

14. The system of claim 13, wherein said flow sensor includes a paddle wheel flow transmitter and a flow indicator electrically connected to said paddle wheel flow transmitter.

15. The system of claim 13, wherein said foam storage tank is located on said fire fighting vehicle.

16. The system of claim 13, further comprising:

a ratemeter;

a switch having a normally open contact;

a battery having a positive terminal and a negative terminal;

a solar panel having an output;

a voltage regulator having a first positive terminal connected to said positive terminal of said battery, a second positive terminal connected to said output of said solar panel, a load positive terminal connected to said normally open contact of said switch;

wherein said normally open contact of said switch is connected to said ratemeter, wherein said ratemeter has an input terminal connected to an output of said paddle wheel flow sensor, and wherein said paddlewheel flow sensor has an output connected to an input of said ratemeter.

17. The system of claim 13, wherein said surrogate fluid mixture comprises an environmentally benign, biodegradable dye.

18. The system of claim 13, wherein the flow rate of said surrogate fluid through said metering valve is varied when a user is using said foam free system to test a plurality of nozzles on said fire fighting vehicle, said plurality of nozzles including roof turrets and handline nozzles.

* * * * *